United States Patent
Nogi et al.

(10) Patent No.: US 6,520,142 B2
(45) Date of Patent: Feb. 18, 2003

(54) ENGINE CONTROL SYSTEM FOR CONTROLLING IN-CYLINDER FUEL INJECTION ENGINE

(75) Inventors: Toshiharu Nogi, Hitachinaka (JP); Takuya Shiraishi, Hitachinaka (JP); Minoru Ohsuga, Hitachinaka (JP); Noboru Tokuyasu, Hitachi (JP); Yoko Nakayama, Hitachi (JP); Yutaka Takaku, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/036,510

(22) Filed: Jan. 7, 2002

(65) Prior Publication Data

US 2002/0053336 A1 May 9, 2002

Related U.S. Application Data

(63) Continuation of application No. 09/599,517, filed on Jun. 23, 2000, now abandoned.

(30) Foreign Application Priority Data

Jun. 23, 1999 (JP) ............................................. 11-176291

(51) Int. Cl.⁷ .............................. F01N 3/08; F01N 3/20
(52) U.S. Cl. .......................... 123/299; 123/300; 60/285
(58) Field of Search ................................ 123/295, 299, 123/300, 305, 309, 568.14, 90.11, 90.15; 60/285

(56) References Cited

U.S. PATENT DOCUMENTS

| | | | | |
|---|---|---|---|---|
| 4,467,763 A | * | 8/1984 | Gillespie et al. | 123/414 |
| 4,736,724 A | * | 4/1988 | Hamburg et al. | 123/435 |
| 5,027,764 A | | 7/1991 | Reimann | 123/143 B |
| 5,642,705 A | * | 7/1997 | Morikawa et al. | 123/300 |
| 5,673,554 A | * | 10/1997 | DeFreitas et al. | 60/39.821 |
| 5,845,480 A | * | 12/1998 | DeFreitas et al. | 60/274 |
| 6,041,591 A | * | 3/2000 | Kaneko et al. | 60/274 |
| 6,105,550 A | * | 8/2000 | Nieberding | 123/27 R |
| 6,192,858 B1 | * | 2/2001 | Nieberding | 123/323 |
| 6,213,086 B1 | * | 4/2001 | Chmela et al. | 123/276 |
| 6,230,683 B1 | * | 5/2001 | Zur Loye et al. | 123/435 |
| 6,234,123 B1 | * | 5/2001 | Iiyama et al. | 123/90.15 |

FOREIGN PATENT DOCUMENTS

| | | | | |
|---|---|---|---|---|
| DE | 19519663 | | 5/1996 | |
| EP | 0886050 | | 12/1998 | |
| GB | 2327980 | | 2/1999 | |
| JP | Hei 9-287527 | | 11/1977 | |
| JP | 64863 | * | 2/2000 | F02D/13/02 |
| JP | 20765 | * | 1/2001 | F02D/13/02 |
| WO | 98/07973 | | 2/1998 | |

OTHER PUBLICATIONS

M. Stockinger, et al., "Versuche an Einem Gemischansaugenden Verbrennungsmotor mit Selbstzuendung" MTZ Motortechnische Zeitschrift, vol. 53, No. 2, Feb. 1, 1992.
Search Report.

\* cited by examiner

*Primary Examiner*—Tony M. Argenbright
*Assistant Examiner*—Hai Huynh
(74) *Attorney, Agent, or Firm*—Crowell & Moring LLP

(57) ABSTRACT

In order to provide a system that lower NOx emission and an improved fuel consumption are obtained by making the igniting control possible in the wide operation range by performing the fuel injection and the ultra lean burning with the homogeneous air-fuel mixture, in the engine having the compression igniting mode, in the in-cylinder fuel injection engine having the compression igniting mode, means for performing the first fuel injection for the initial combustion speed control before igniting and the second fuel injection for the engine torque control after that, are provided. The second fuel injection ratio for the engine torque control is increased according to the engine torque. Furthermore, in order to improve the igniting, the igniting trigger means is provided in the in-cylinder fuel injection engine having a compression igniting mode and the igniting trigger is added by the igniting trigger means after the first fuel injection.

20 Claims, 14 Drawing Sheets

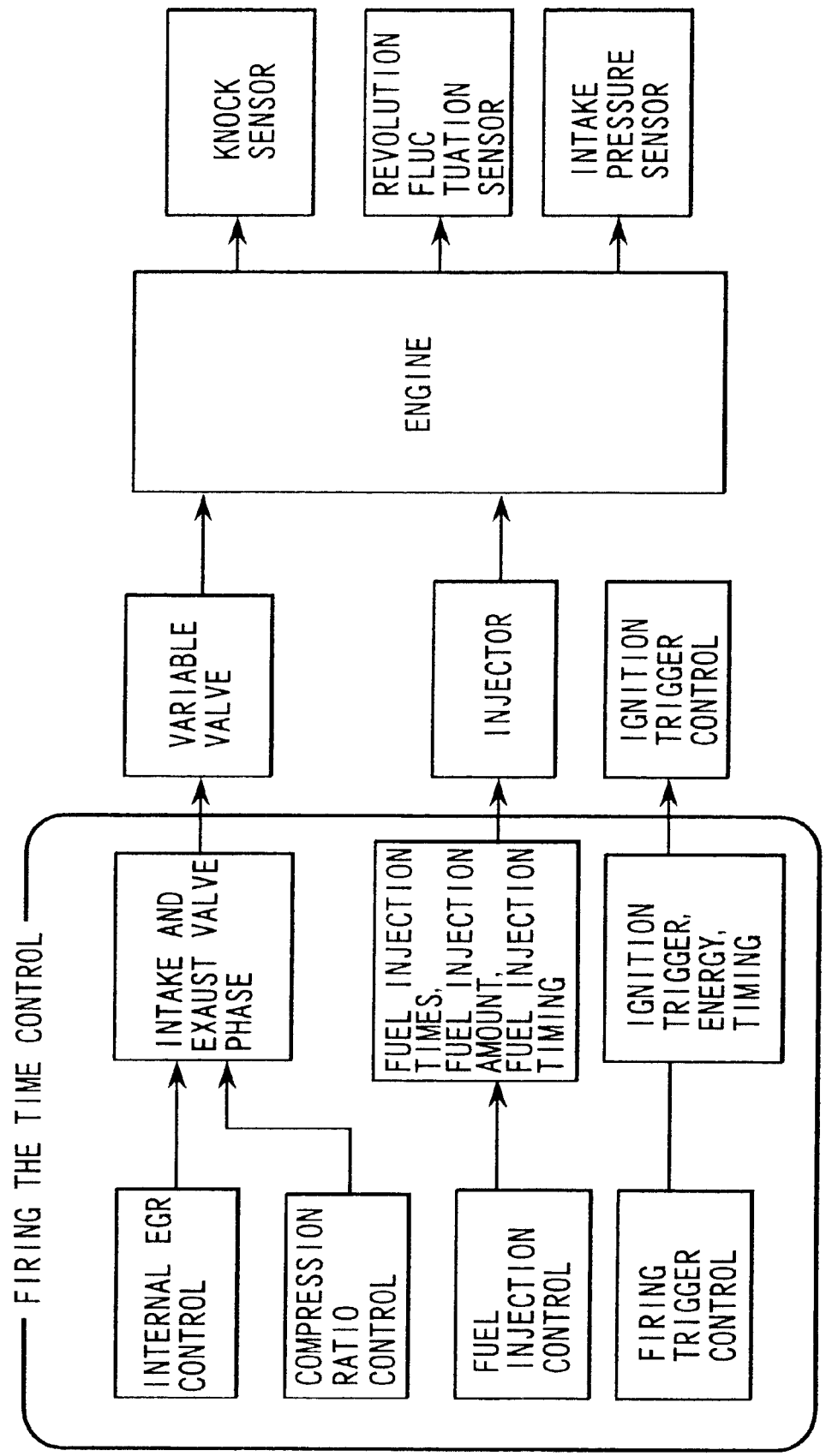

ENGINE CONTROL SYSTEM FOR CONTROLLING IN-CYLINDER FUEL INJECTION ENGINE

This application is a continuation of application Ser. No. 09/599,517, filed Jun. 23, 2000, now abandoned.

BACKGROUND OF THE INVENTION

Present invention relates to an engine control system, especially relates to a compression igniting type engine control system.

A lean burn engine is widely known to let a lean air-fuel mixture burn as an effective means for enhancing efficiency of the engine.

The pumping loss becomes little by making the fuel burn leanly, because more air is inhaled to the engine when driving it with an equal torque.

In a gasoline engine used widely today, the air-fuel mixture is ignited with the spark plug, and the flame propagation can be attained.

However, the lean air-fuel mixture of the air fuel ratio such as 40 around is difficult to be ignited, and the burning becomes unstable.

Therefore the fuel is directly injected in a cylinder of the engine, and the air-fuel mixture is gathered near by the spark plug, thereby the good burning of the air-fuel mixture can be secured and it is used for the engine for the automobile.

The fuel consumption in such an in-cylinder fuel injection engine is enhanced, however as the fuel is injected in the cylinder, temperature of the inhaled air falls by vaporization of the fuel, air density becomes high, and there arise a merit too that can improve by charging efficiency. However, as the air-fuel mixture concentrates near around the spark plug, combustion temperature becomes high, and there arises a subject as that NOx is easy to increase.

In the lean burning of the homogeneous air-fuel mixture, as the rise of the combustion temperature can be restrained, NOx can be made low. However, as the igniting and the flame propagation are unstable, the air fuel ratio in the driving is limited under 23 around, and the fuel consumption enhancement are limited to 15%, too.

In Japanese Patent Laid-open No. 9-287527, a homogeneous air-fuel mixture is formed in the cylinder by intake port fuel injection, the lean mixture can be burn by a compression igniting. The fuel mixture is burned by not the spark ignition but the compression igniting, the igniting from many igniting sources becomes possible, the flame propagation distance is short, too, and insurance of ignitability, and rapid burning are realized. Because being a uniform air-fuel mixture, a large reduction of NOx is possible.

However when the torque increases (when quantities of the fuel is much), the burning pressure becomes high rapidly, knocking is generated, and there is a subject as that operation range is narrow. That is, a compulsion igniting means as spark ignition is not provided, the control of the igniting becomes difficult.

Making burning advanced by external EGR and controlling ignitability by controlling the intake temperature, are disclosed, a responsibility of the external EGR and the intake temperature control are so retarded, and a following characteristics is a problem, when the engine torque as in the automobile changes.

SUMMARY OF THE INVENTION

The first object of present invention, is to provide a system in which NOx is low and a fuel consumption can be improved in an engine having compression igniting mode, by making it possible to ignite the fuel in a large operation range by providing a fuel injection and by ultra-leanly burning the homogeneous air-fuel mixture.

The second object of the present invention is to improve an igniting controllability by an igniting trigger means.

In order to achieve the first object mentioned above, in the in-cylinder fuel injection engine driven with a compression igniting mode, a first fuel injection for controlling a initial combustion speed before igniting and a second injection for controlling an engine torque after that, are provided, ignitability can be balanced with a torque contrillability by increasing the second fuel injection ratio for the engine torque control according to the engine torque.

The second object of the present invention is to improve the igniting controllability by providing an igniting trigger means in an in-cylinder fuel injection engine having a compression igniting mode.

Any one of a microtron, a laser, an spark plug, EGR, compression ratio control means and a combination thereof is provided as the igniting trigger means, thereby the temperature of the air-fuel mixture is raised higher.

Moreover, a rich spot is formed in the homogeneous air-fuel mixture, and the air-fuel mixture that is easy to be ignited is formed.

BRIEF DESCRIPTION OF THE DRAWINGS

FIG. 6 shows an explanatory drawing of the operation of the engine control system in the present invention.

FIG. 10 shows a block diagram in the present invention.

DETAILED DESCRIPTION OF THE PREFERRED EMBODIMENTS

Figure 1:
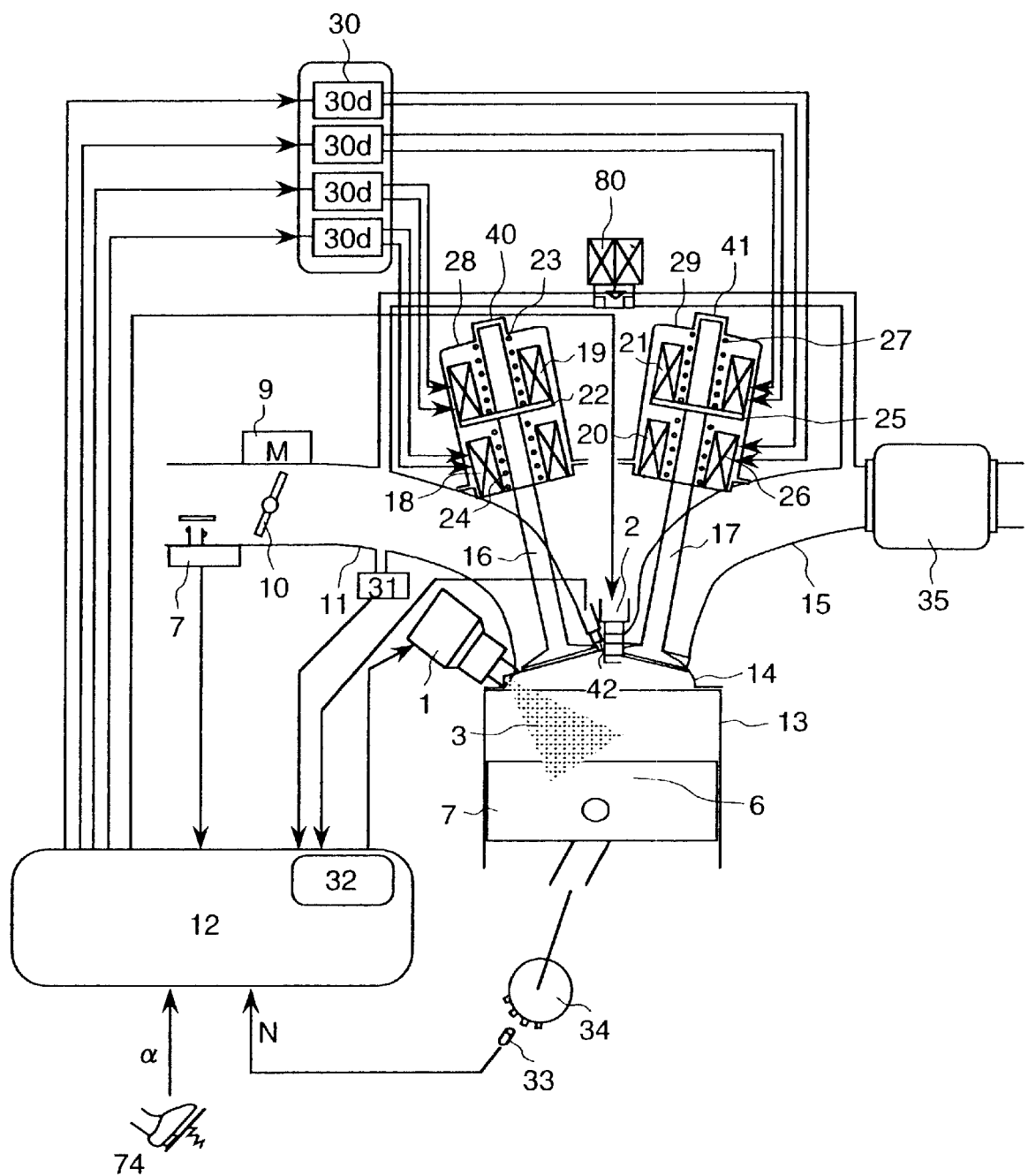
FIG. 1 shows an engine control system in the present invention.

An embodiment of the present invention will be explained by using drawings. Construction of the present invention is shown in FIG. 1.

Air is inhaled into an engine 13 through an air amount detection sensor 7, a throttle valve 10, a intake pipe 11, and a intake valve 16. An air amount can be controlled by changing opening of the throttle valve 10 and opening of the intake valve 16. An air amount is measured by an air amount detection sensor 7.

According to any necessity, pressures in the intake pipe and the cylinder are respectively detected, by using a pressure sensor 31 provided in the intake pipe, and a pressure sensor 42 provided in an in-cylinder. Relating to the intake valve, for example, a movable element 22 moves with an action of the electromagnetic force by applying a voltage from an activation circuitry 30 to electromagnetic solenoid coils 18, 19, and the intake valve 16 that led to the movable element 22 opens and closes.

Similar action is performed relating to the exhaust valve 17. As for the intake valve and the exhaust valve, a cam system driven by an engine and a system to be driven by oil pressure may be used. In order to control the internal EGR, the compression ratio of the engine however, it is preferable to change overlap of the intake valve and the exhaust valve. Fuel is supplied from an injector 1 that can directly inject the fuel in the cylinder. The injector is driven by an activation circuitry 32. The activation circuitry may be built in a control device 12. A throttle valve is operated to open and close by a motor 9, and the opening thereof is detected by a throttle sensor 8. Accelerator opening a is detected by an accelerator opening sensor (it is not shown by a drawing), and the intake valve and the exhaust valve are controlled based on at least the accelerator opening sensor signal. A circuitry for controlling the throttle valve may be built in the control device 12. Based on signal from the above sensor, the control device 12 controls the throttle valve, the intake valve and the exhaust valve.

Revolution fluctuation of the engine is detected by a revolution sensor 34 and a revolution sensor pick up 33 arranged to a crank shaft of the engine. A EGR valve 80 is arranged so as to control the EGR. A catalyst 35 is arranged to an exhaust pipe. The catalyst has a function as a three way catalytic converter and a NOx purification function.

A reaction type catalyst is desirable as a NOx catalyst, because the lower NOx emission is attained by compression ignition, deterioration by sulfur contained in the fuel is heavy, rich spikes is not necessary. However, in a case that sulfur density in the fuel is low, an adsorption type or an absorbtion type catalyst that conversion efficiency of NOx is high may be used.

Figure 2:
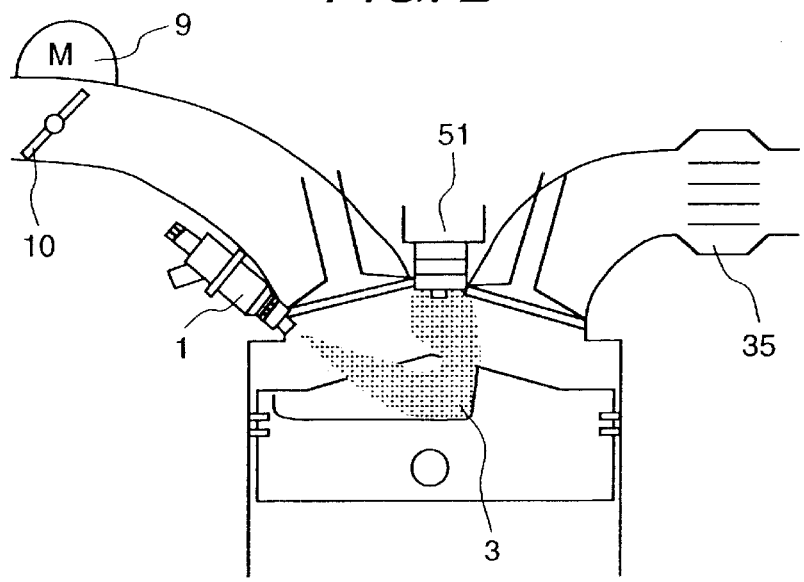
FIG. 2 shows a conventional in-cylinder fuel injection engine.

Construction of a conventional spark ignition type in-cylinder fuel injection engine is shown in FIG. 2. The fuel which is directly injected in a cylinder from an injector 1 is guided in a cavity (impression) arranged on a piston so as to concentrate around an spark plug 51. According to such a construction, even in an air-fuel mixture being low density, because the air-fuel mixture can be gathered around the spark plug, and ignition thereof and flame propagation do not become unstable. However, as the air-fuel mixture of a burning part becomes a density nearby a stoichiometric air fuel ratio by the concentration of the air-fuel mixture, combustion temperature-becomes high, and a emission amount of NOx is apt to increase.

Figure 3:
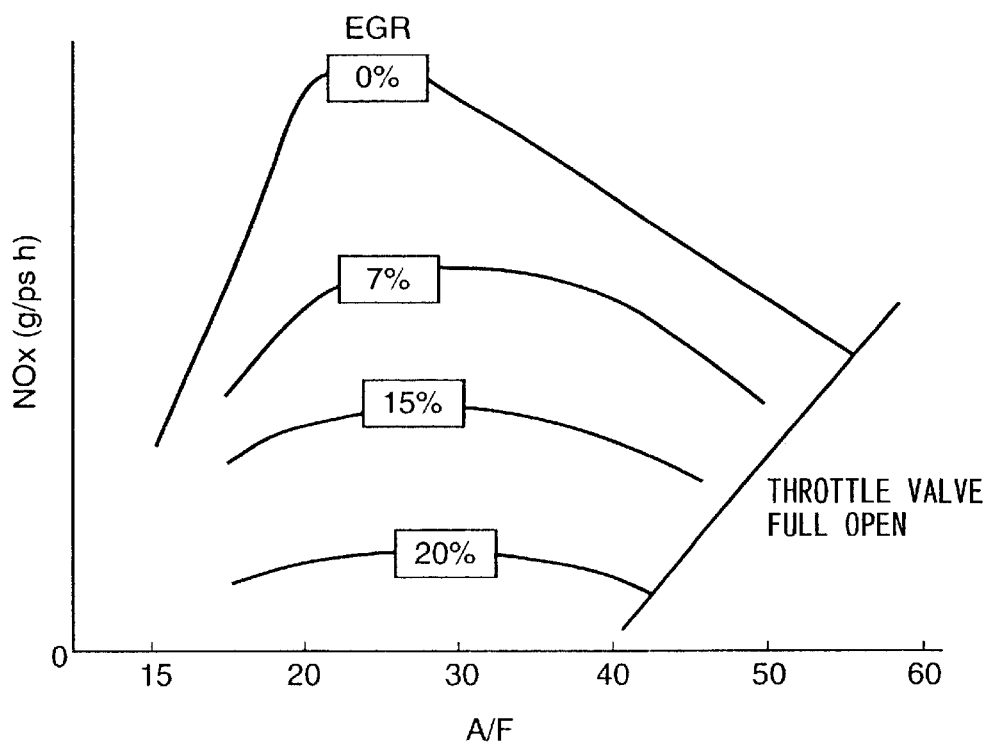
FIG. 3 shows NOx emission characteristic of the conventional in-cylinder fuel injection engine.

NOx emission characteristic of the in-cylinder fuel injection engine is shown by FIG. 3. The air fuel ratio is shown in a horizontal scale, and NOx emission amount is shown in a vertical scale. When the EGR is not added, the air fuel ratio is 25 around, and emission of NOx increases. This is caused by concentrating the air-fuel mixture.

In a uniform air-fuel mixture, a peak of NOx appears at the air fuel ratio 16–17 around, and the air fuel ratio becomes 25 as a whole by concentrating the air-fuel mixture in the in-cylinder fuel injection, because the air-fuel mixture becomes rich in a perimeter of the spark plug further. The combustion temperature falls by adding the EGR and NOx can be made smaller. By a combination with the catalyst, the exausted NOx can be reduced even in a catalyst exit, however, the NOx exausted from the engine needs to be reduced in order to reduce NOx further.

Figure 4:
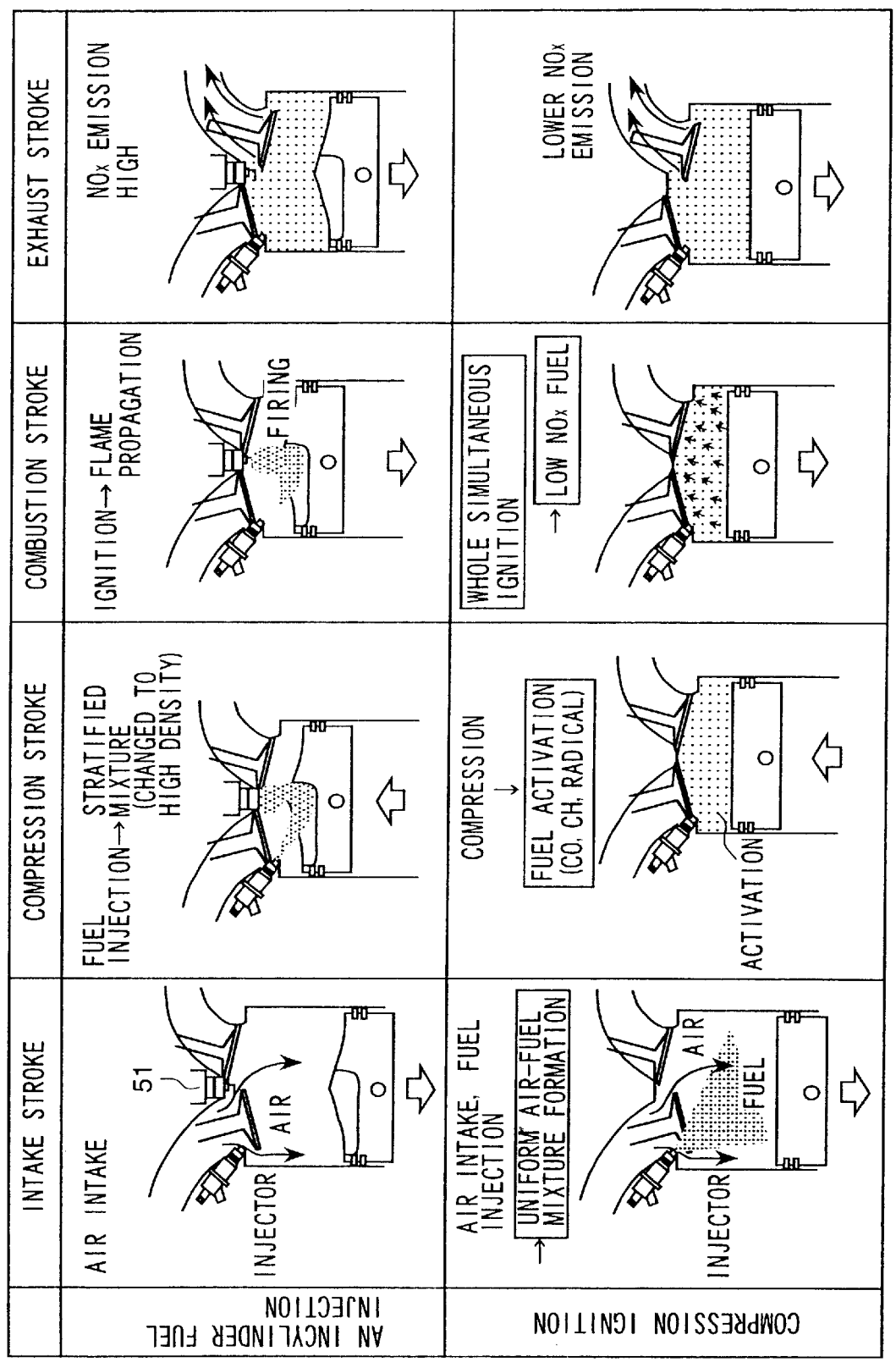
FIG. 4 shows an explanatory drawing for the operation of the conventional in-cylinder fuel injection engine.

A compression igniting system is shown in FIG. 4 in comparison with a conventional in-cylinder fuel injection system. When lean burning is performed in the in-cylinder fuel injection, the fuel is injected with a compression stroke, and the air-fuel mixture is concentrated to the spark plug perimeter. The concentrated air-fuel mixture is ignited with the spark plug so as to be burned. As mentioned above, the combustion temperature becomes high by the concentration of the air-fuel mixture and NOx is easy to become high. In the compression igniting on the other hand, the fuel is injected in a intake stroke, and a uniform air-fuel mixture is formed in a cylinder. The uniform air-fuel mixture is activated with a compression heat in the compression stroke, a state which is easy to be ignited appears, and a radical-flame (CO, CH, radical) occurs. Simultaneous ignition of whole cylinder mixture (hot flame) occurs after that. Because being a ultra lean burning with the uniform air-fuel mixture, the combustion temperature is low, and lower NOx emission burning can be realized.

Figure 5:
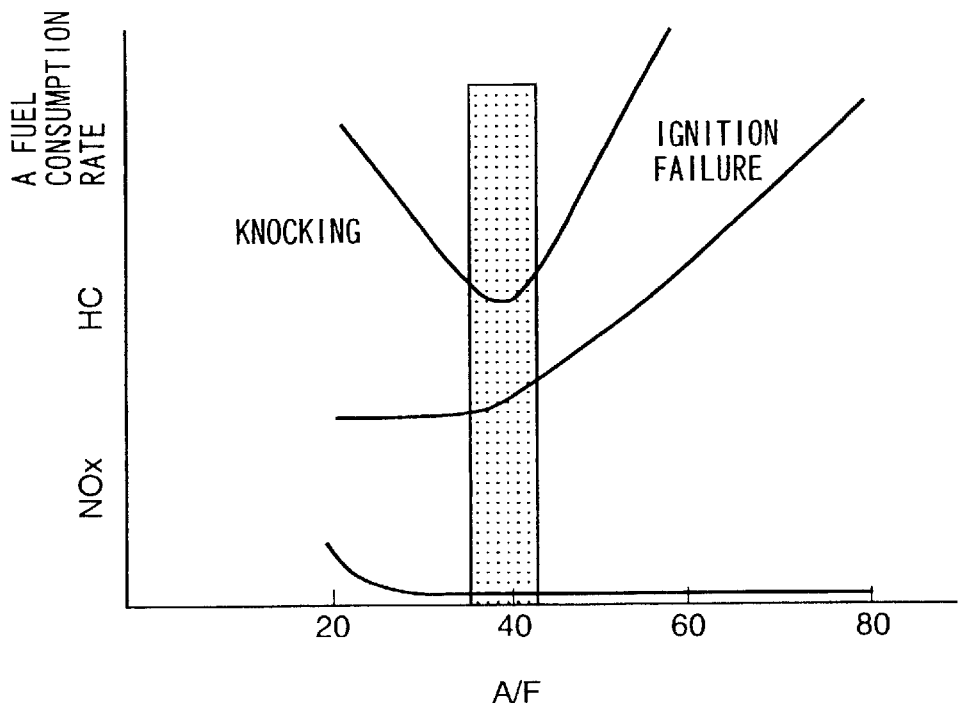
FIG. 5 shows a relationship of NOx, HC and the fuel consumption rate with the air fuel ratio.

However as the range of the air fuel ratio, that is, a range of torque that can be driven in stable is very narrow. When the air fuel ratio is large, the radical-flame from a premixed air-fuel mixture is not enough and is apt to provide an igniting failure, and HC increases as shown in FIG. 5. On the other hand, there are many radical-flames from the premixed air-fuel mixture in a region where the air fuel ratio is small, and as the internal pressure of the cylinder suddenly goes up, knocking is easy to be generated. On this account, the emission amount of the NOx is low, but the fuel consumption rate is low and the region is narrow. Up to now, the igniting failure in a lean air fuel ratio side is prevented by raising a intake temperature and the knocking of a rich side is avoided by making the burning slow by an external EGR. The responsibility of the external EGR and the intake temperature control is so retarded, and it becomes difficult to follow it when the engine torque changes as in an automobile.

Figure 6:
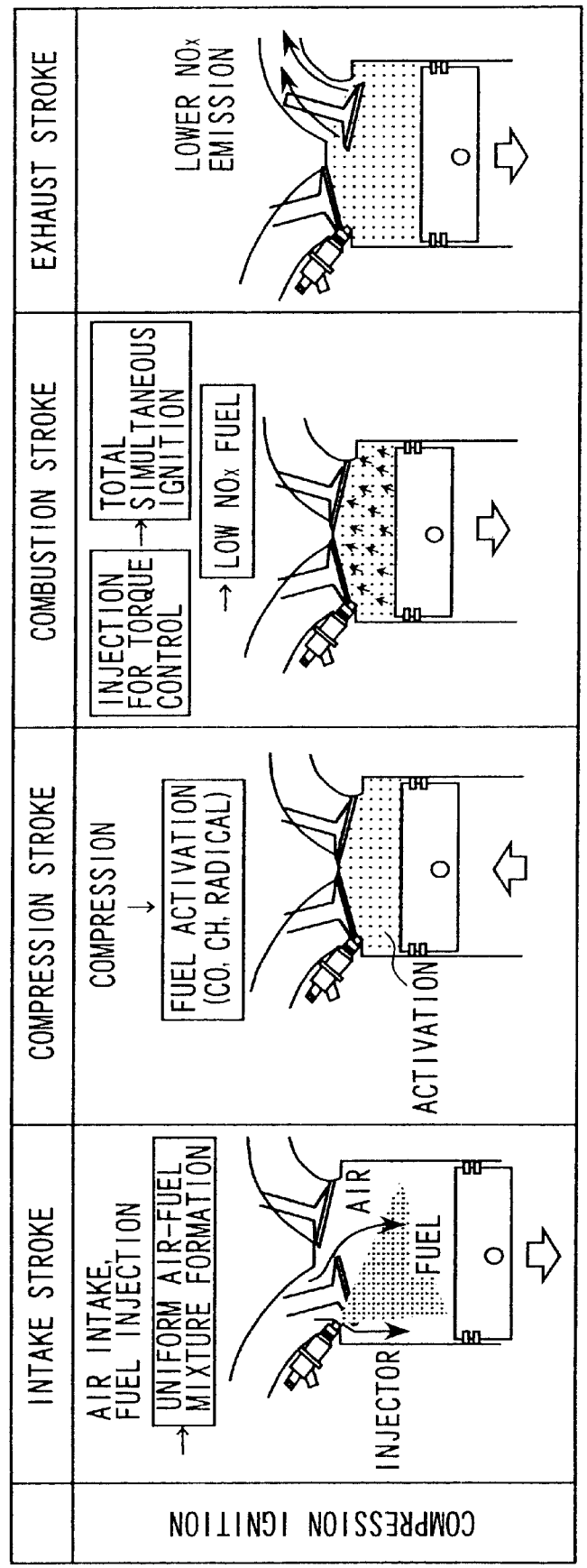
FIG. 6 shows an explanatory drawing of the operation in the present invention.

An operation of present invention is shown in FIG. 6. The first fuel injection is performed by a intake stroke. Thereby a uniform air-fuel mixture in a cylinder is formed. This air-fuel mixture is used for a initial combustion speed control. That is, with a compression stroke, the fuel is activated by a compression heat, a radical occurs, and it has a role to control this initial burning. After the radical occurs in the next, the second fuel injection for a torque control is performed. Thereby, the fuel necessary for the engine torque control can be supplied. When the fuel is supplied during the radical is generating, a low temperature burning that does not generate soot can be realized. There arises an effect too as that lower NOx emission and no soot burning are attained.

In the control system as before, as only the premixed air-fuel mixture is formed, when the quantities of the fuel increase namely the air fuel ratio becomes small, the radical generation in the compression stroke increases too much, and the burning is suddenly generated, and there arises a subject to occur the knocking. On this account, the compression ratio of the engine needs to be made low, and the efficiency of the engine is not good. Further, as the burning pressure becomes high, NOx is easy to become high, too.

In the present invention, because the first fuel injection-amount to restrain an initial burning may be changed, the sudden burning can be avoided by increasing the fuel for the torque control when the fuel injection amount increases with the torque increasing. When the fuel injection amount is little (when the air fuel ratio is big), the ignitability can be secured because the compression ratio can be set up highly by avoiding the knocking as above. Furthermore, the ignitability can be secured by an igniting trigger means as mentioned later.

Figure 7:
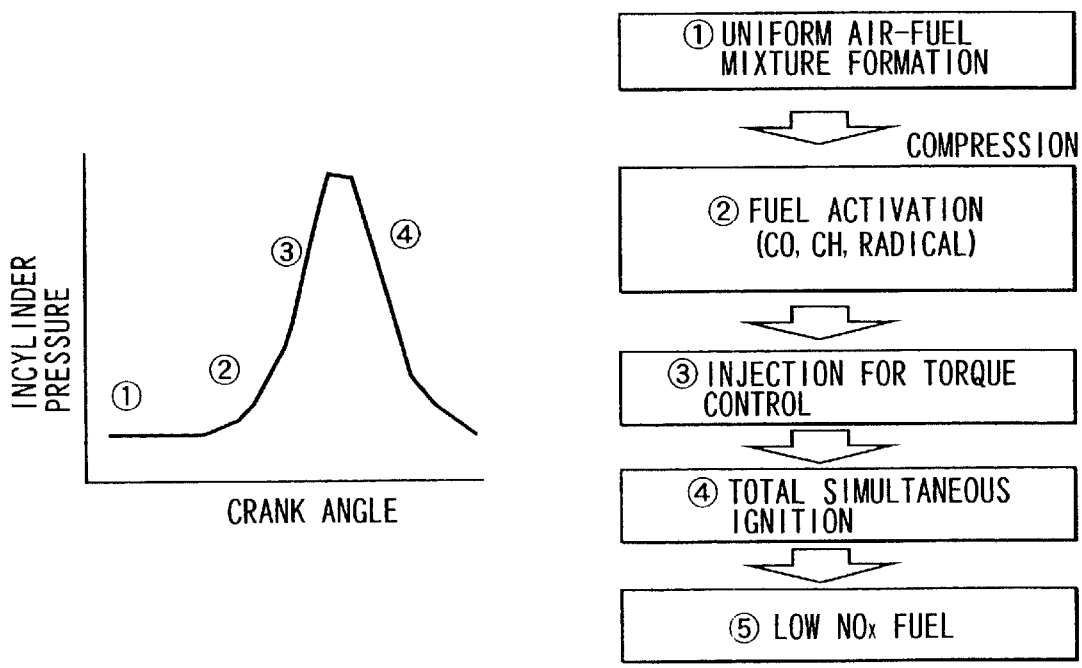
Figure 8A:
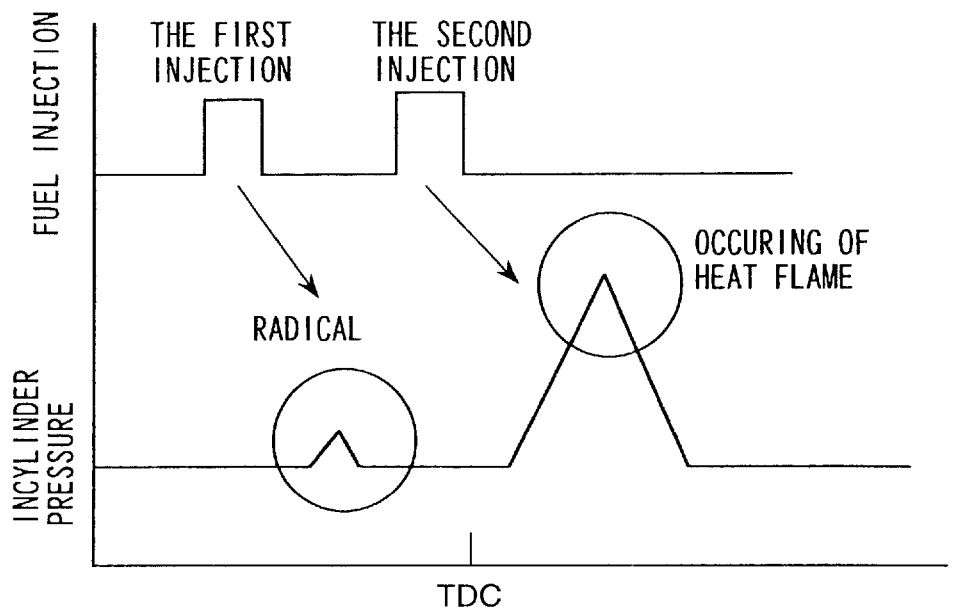
FIG. 8 shows a control method for the fuel injection timing and the fuel injection ratio in the present invention.
Figure 8B:
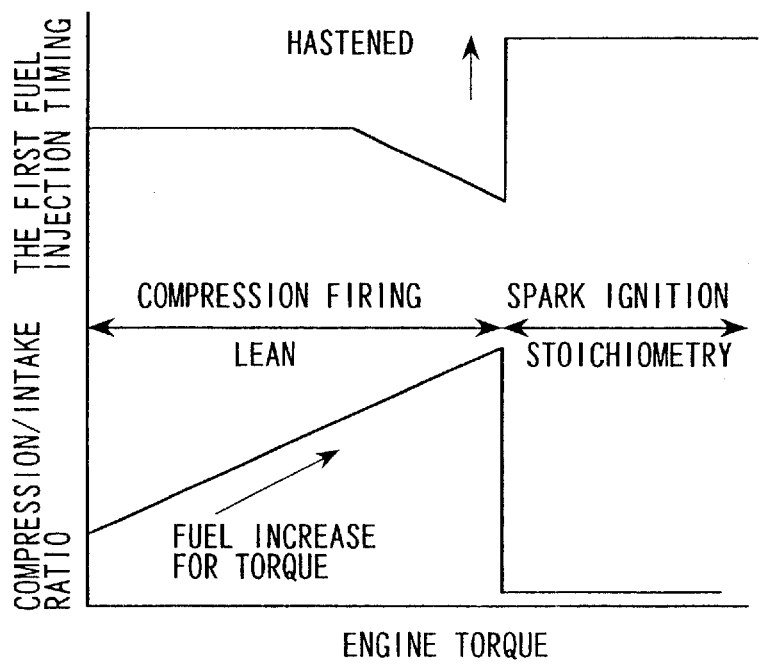

Operation in the present invention is shown by FIG. 7 and FIG. 8. The uniform air-fuel mixture is formed, the fuel is activated with the compression stroke, and the fuel for the torque control is injected after generating the radical-flame (CO, CH, radical). By injecting in the second during radical generating, the all cylinder mixture for the torque control is ignited (hot flame) simultaneously too, and the lower temperature burning (lower NOx emission) and no soot burning can be realized. By such an operation as above, both of a torque controllability and an igniting controllability can be attained for in a large operation range.

A control method of the fuel injection time and a ratio of fuel injection amount at compression stroke to fuel injection amount at intake stroke (ratio of the second fuel injection to the first fuel injection) will be shown in FIG. 8. The torque of the engine is shown by the horizontal scale, and the torque of then engine is bigger in the right side and more amount of the fuel is supplied. When the engine torque is small, the compression igniting operation with the lean air-fuel mixture is performed. At first, in the first fuel injection timing of the intake stroke, the fuel is injected, thereby a uniform air-fuel mixture is formed. According to the engine torque being increased, the fuel injection ratio of compression stroke to intake stroke (the second to the first fuel injection ratio) is controlled to be bigger, that is, the fuel for torque control is increased. Thereby, rise of the pressure by the rapid burning from the premixed air-fuel mixture is prevented, and the knocking is prevented too. When the engine torque increases further, the first fuel injection timing is controlled to approach a top dead center so as to be retarded. By the compress heat of the premixed air-fuel mixture which injected and by shortening the activation clock time, generation of the radical-flame is restrained. When the engine torque increased further, the compression fuel injection ratio is controlled to be zero, and only the fuel injection in the intake stroke operates. Moreover, a compression igniting mode is changed to a spark ignition mode. At this time, the spark plug needs to be kept within the engine. The voltage to the spark plug is applied in the spark ignition mode. In the spark ignition mode, there is a possibility for the knocking to generate, and the compression ratio is controlled to be small such as 10–12 around.

Figure 9:
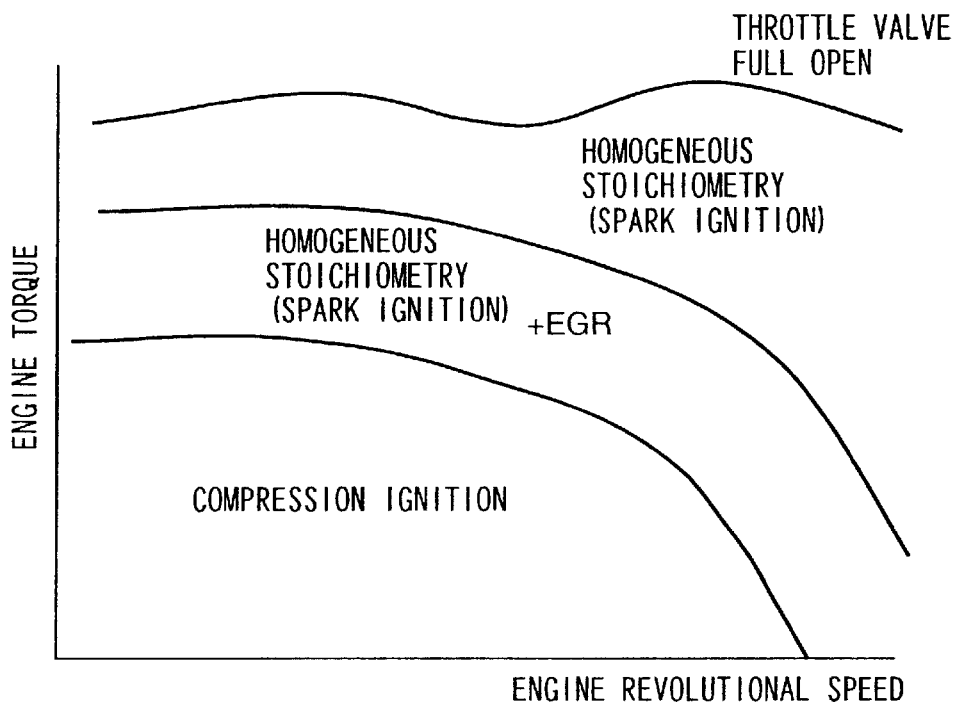
FIG. 9 shows a mode of the operation map in the present invention.

In an operation range that the engine revolution speed is low and the engine torque is small as shown in FIG. 9, the lean burning operation is performed by the compression igniting, in order to enhance the fuel consumption. According to the torque of the engine becoming bigger, the stoichiometric air fuel ratio is added the EGR further. According to the output becoming big further, it is set up in the stoichiometric air fuel ratio. The combustion temperature is controlled to fall by the EGR, the fuel consumption and NOx emission are reduced consequently. It is shifted to the spark ignition mode in the stoichiometric air fuel ratio operation range. Moreover, in this embodiment, by dividing into an fuel injection for a initial combustion speed control and an fuel injection for the torque control, the knocking can be restrained, and it can be operated with a whole region compression igniting mode.

A basic construction of the present invention is shown in FIG. 10. An internal EGR control and a compression ratio control are:performed for the igniting control. These are performed by controlling a cam phase of the intake and the exhaust valves. An overlap of the intake and the exhaust valve are controlled to be bigger in order to increase the internal EGR. In order to make the compression ratio low, the intake valve is closed in advance or in retarded. Moreover, by controlling the fuel injection, the fuel injection number of times, the fuel injection-amount, and the fuel injection timing are controlled. An igniting trigger control means is provided for enhancing the igniting controllability further. Energy and the time of the igniting trigger are controlled. Knocking of an engine is detected by a knock sensor or an in-cylinder pressure sensor, and the torque fluctuation is detected by a revolution fluctuation sensor or the an in-cylinder pressure sensor. The generating time of the radical may be detected by an in-cylinder pressure sensor, and an in-cylinder pressure waveform may be detected an ionic current sensor and a radical sensor which detects a ignite of the burning directly (for example, a combination of a quartz glass fiber, a photo-electric converter, and a filter).

Figure 11:
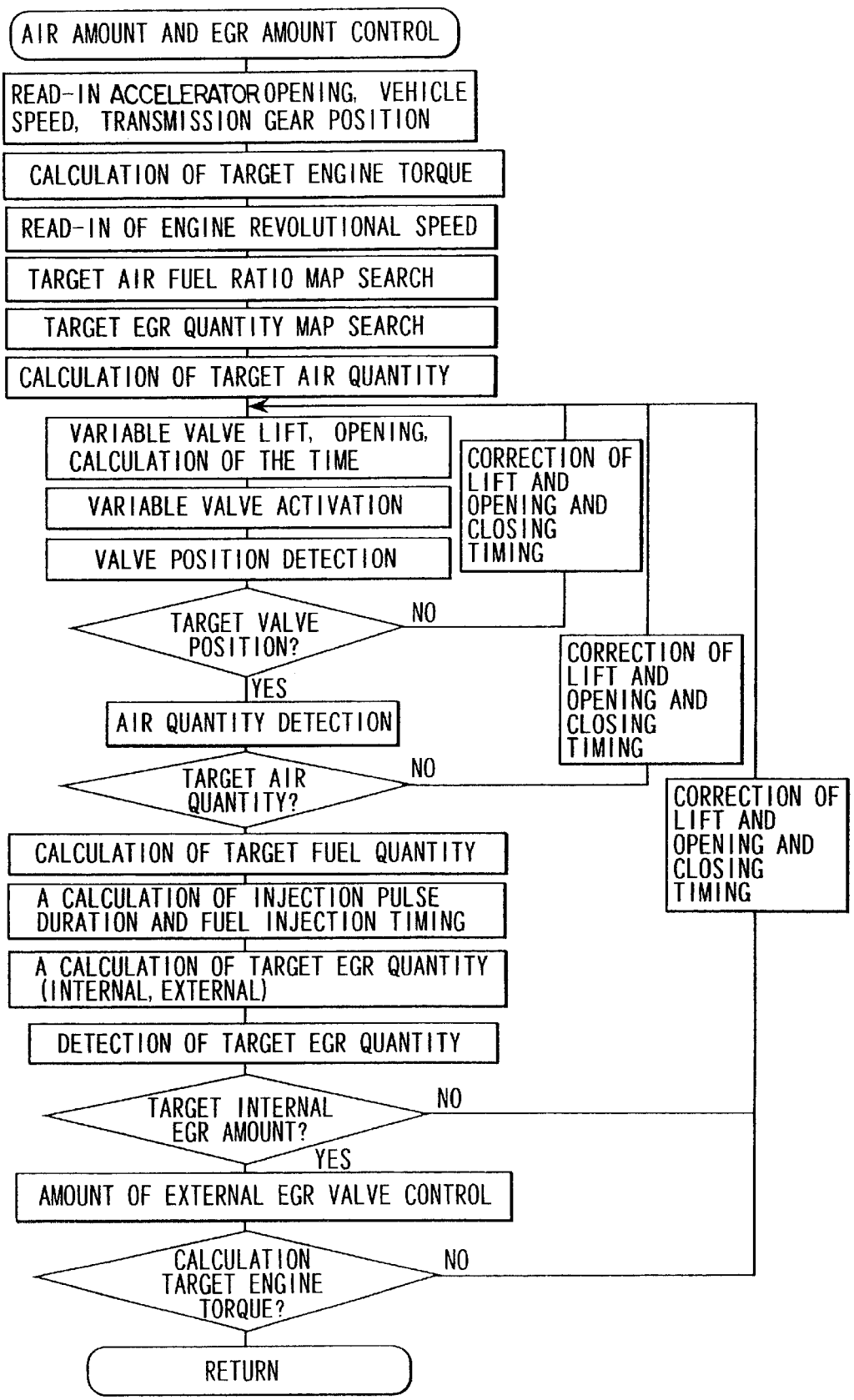
FIG. 11 shows a flow chart in the present invention.

An example of a flow chart of an air amount and EGR control is shown by FIG. 11. An target engine torque is calculated based on an accelerator opening, a vehicle speed, and a gearing shift position. Furthermore, an engine revolution speed is detected, maps of target air fuel ratio and target EGR are searched based on the target engine torque and the engine revolution speed. Target air amount is obtained as above, and a valve lift and an opening and closing times of the valve are calculated. By aiming the above valve lift and the opening and closing times, the variable valve mechanism 13 is controlled, and an air amount to the respective cylinders of the engine 13 is controlled. The valve position is detected by a valve position sensor 76, and a feedback control is performed so as to open and shut the valve with an target valve position and an target timing. An air amount which is inhaled into the engine, is detected in every each cylinders by the air flow meter 7, and it is compared whether the target air amount is attained and it is controlled to be fed back. A amount of fuel becoming the target air fuel ratio is calculated based on this air amount, and the fuel injection pulse duration and the fuel injection time are calculated.

Furthermore amount of target EGR is calculated relating to quantities of an internal EGR and an external EGR thereof. Based on a reverse flow detection air flow sensor or the in-cylinder pressure sensor signal, the amount of the internal EGR is detected, and it is compared with a amount of the target EGR, and if it is deviated from the target value, the intake valve opening and closing time is controlled. Relating to a shortage minute of the internal EGR, it is controlled with the external EGR valve further. The output torque of the engine is detected with a crank angle sensor or the in-cylinder pressure sensor further, it is compared whether it is the target engine torque and it is fed back. When the in-cylinder pressure sensor is used, because an air amount in the cylinder can be detected from the in-cylinder pressure after the intake valve is closed, the air flow meter can be expelled. A control method to control the air amount by a variable valve is shown as above, however, the throttle valve is controlled to keep the target air amount when the variable valve controls only the cam phase.

In a flow chart shown in FIG. 11, the control of the air amount performed by controlling the variable valve lift and the opening and closing times may be replaced with a control by a throttle valve.

Figure 12:
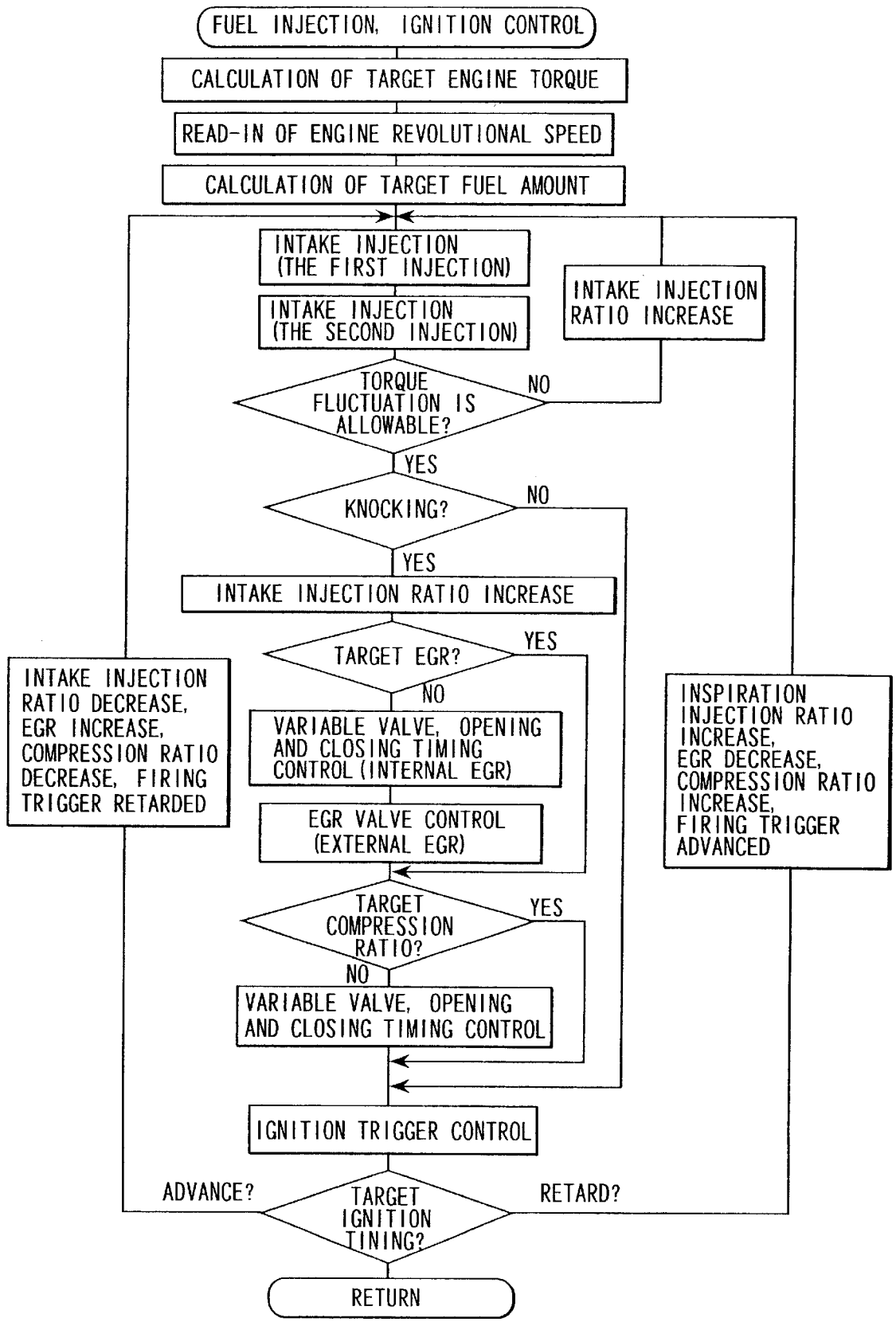
FIG. 12 shows a flow chart in the present invention.

In FIG. 12, an example of a flow chart of the fuel injection and the igniting control is shown. Based on the target engine torque and the engine revolution speed, the fuel injection amount is calculated. Thereby, the intake to compression fuel injection ratio (the first to the second fuel injection ratio) is determined and the intake fuel injection and the compression fuel injection are performed. When the torque fluctuation becomes more than the allowable value, the intake fuel injection ratio is increased and the radical is promoted to be generated. When the knocking occurs, the intake fuel injection ratio is controlled to be decreased, and the internal EGR is controlled to become the target EGR further. The control for a variation of the engine torque is performed using the internal EGR by the variable valve thereof. Relating to a part which is not enough to be controlled by the internal EGR, the external EGR is used. The compression ratio control is performed further so as to be equal to the target compression ratio. By using the igniting control means moreover,the igniting trigger control is performed. When being retarded than the target igniting time, the intake fuel injection ratio is controlled to be bigger and the compression ratio is increased, the igniting trigger pulse is advanced, and the EGR is controlled to decrease, thereby the igniting is promoted to be advanced. When being advanced than the target igniting time, the reverse control to the above is performed.

Figure 13:
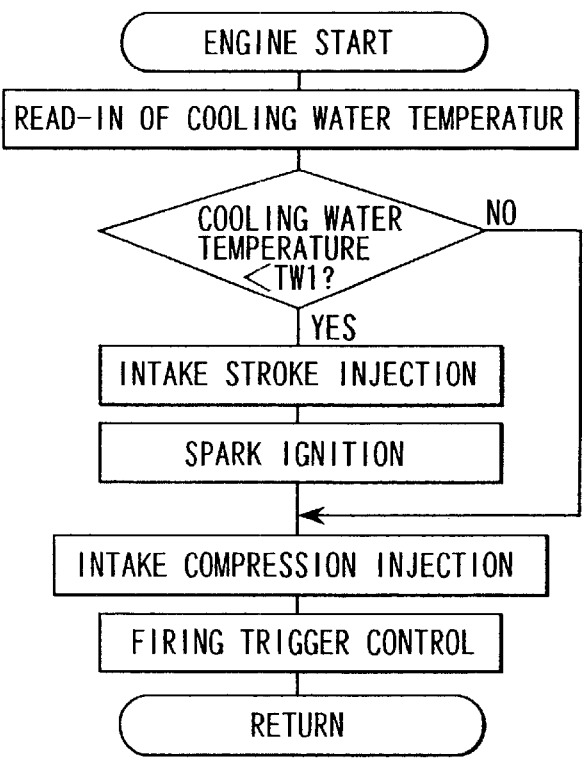
FIG. 13 shows a Flow chart in the present invention.

An example of the flow chart of the starting control is shown by FIG. 13. The coolant temperature is read-in, and if the coolant temperature is lower than the predetermined value, the spark ignition is performed as the fuel injection in the intake stroke. When being higher than the predetermined value, a compression igniting mode is performed by the intake and compression fuel injections and the igniting trigger. This is because, in a condition that an engine is cold, the temperatures of the fuel and intake air are very low, and the compression igniting of the fuel is difficult to be done. In this case, the compression igniting mode should not be performed, and the spark ignition mode is performed. When the revolution speed of the engine is low as in a crancking, the compression pressure does not become so high as being self-ignited, therefore the compression igniting mode is prohibited and the spark ignition mode is performed.

Figure 14:
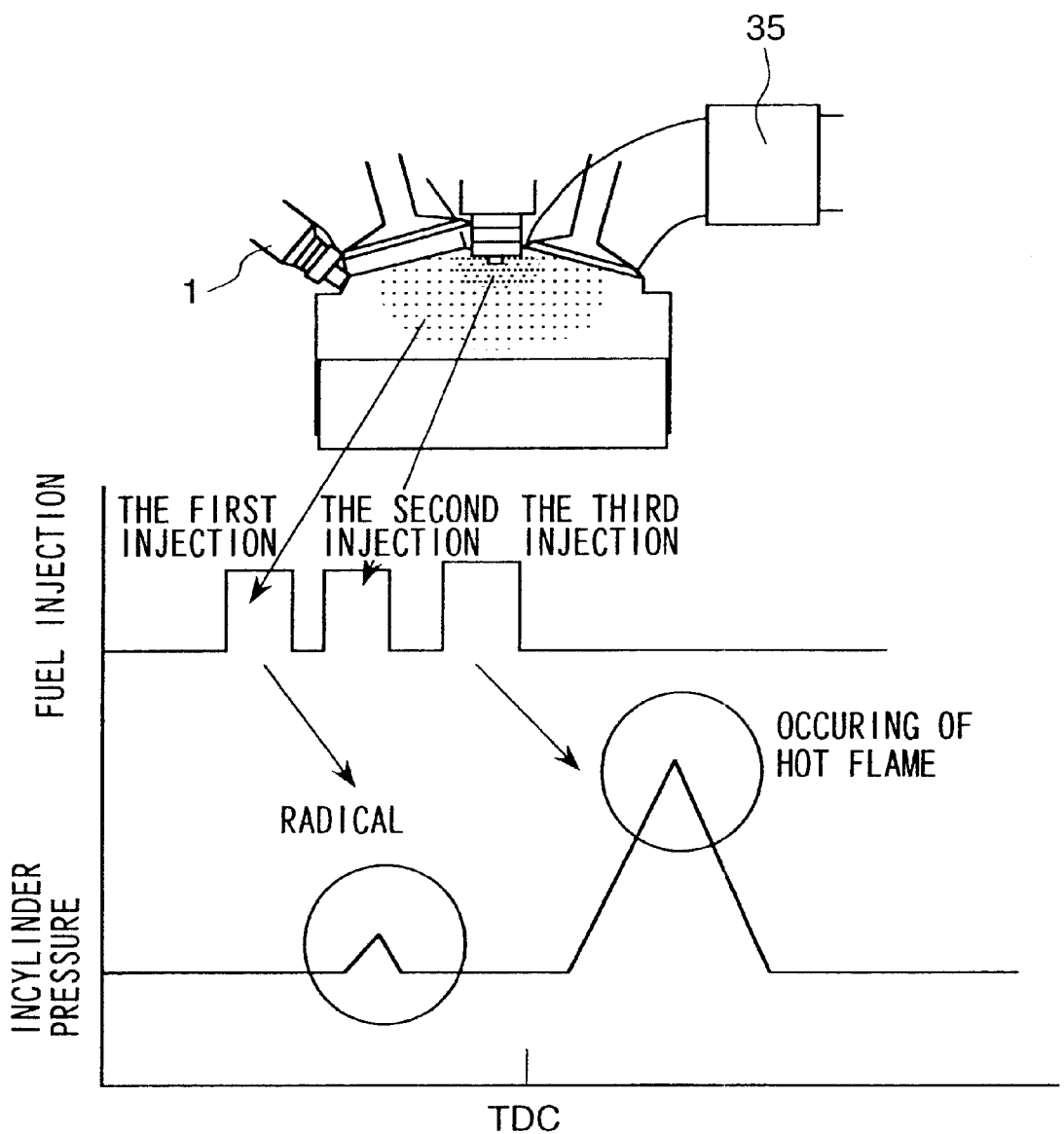
FIG. 14 shows another embodiment of the present invention.

An other embodiment of the present invention is shown by FIG. 14 further. The uniform air-fuel mixture is not formed in the whole cylinder, but the cylinder is formed with the premixed air-fuel mixture that can be compression-ignited, for example, the air fuel ratio is 40 and the rich spot is provided at the igniting trigger perimeter.

Therefore, in a condition that the engine torque is small and the fuel injection amount is little and the premixed air-fuel mixture which can be compression-ignited, is capable to be formed, there is a merit that is easy to be ignited because the rich spot is arranged at the igniting trigger circumference further. When air-fuel mixture is formed in the whole cylinder, and if the air fuel ratio becomes more than 80, the ignitability from the premixed air-fuel mixture falls. When the compression ratio is raised further so as to raise the compression heat, the igniting becomes possible too, however if the compression ratio is raised too much highly, the friction loss of the engine becomes bigger and the engine efficiency falls. According to this embodiment, by controlling size of a lump of uniform air-fuel mixture, the amount of the fuel can be controlled without making the uniform air-fuel mixture thin. This operation forms a uniform air-fuel mixture by the first fuel injection. In this case, because the air-fuel mixture does not disperse in the whole cylinder, the fuel injection timing is brought to be close to the compression stroke. In the second fuel injection furthermore, the rich spot is formed to the igniting trigger perimeter, and the third fuel injection is performed after the radical generating and the torque control is performed.

Figure 15:
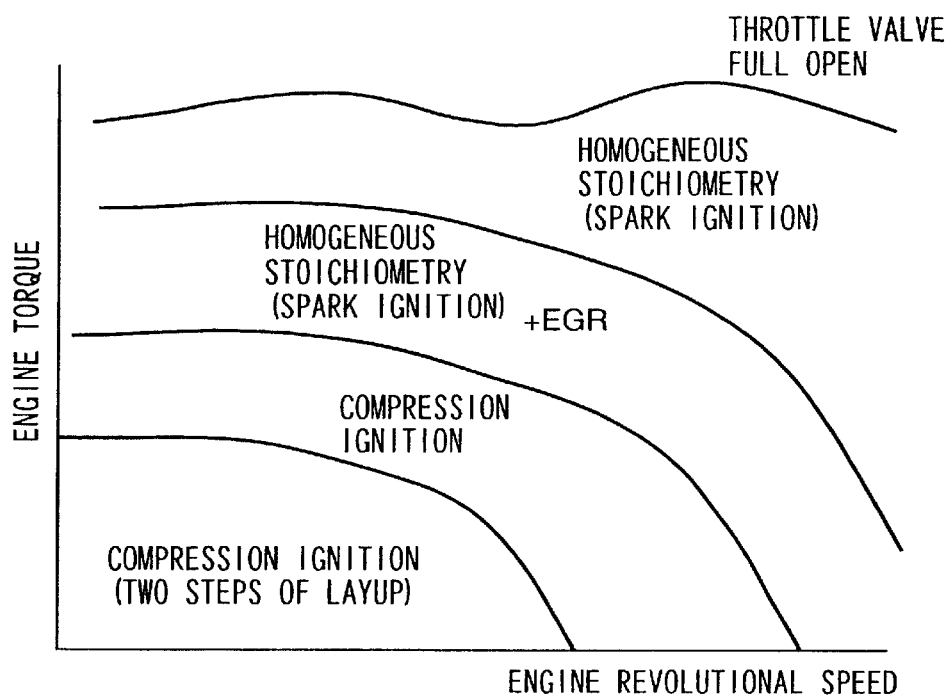
FIG. 15 shows an operation mode map of the another embodiment shown in FIG. 14.

In an operation region that the engine revolution speed is low and the engine torque is small as shown in FIG. 15, the lean burning operation is performed by compression igniting.

In the region where the engine torque of the compression igniting is small, the ignitability is secured by stratified mixture being different concentration. According to the torque of the engine becoming bigger, the EGR is added to the stoichiometric air fuel ratio. According to the output of the engine becoming bigger, it is set up in the stoichiometric air fuel ratio. The combustion temperature is controlled to fall by the EGR, and simultaneously the fuel consumption is improved and the NOx emission is reduced. It is operated with the spark ignition mode in the stoichiometric operation region.

Figure 16:
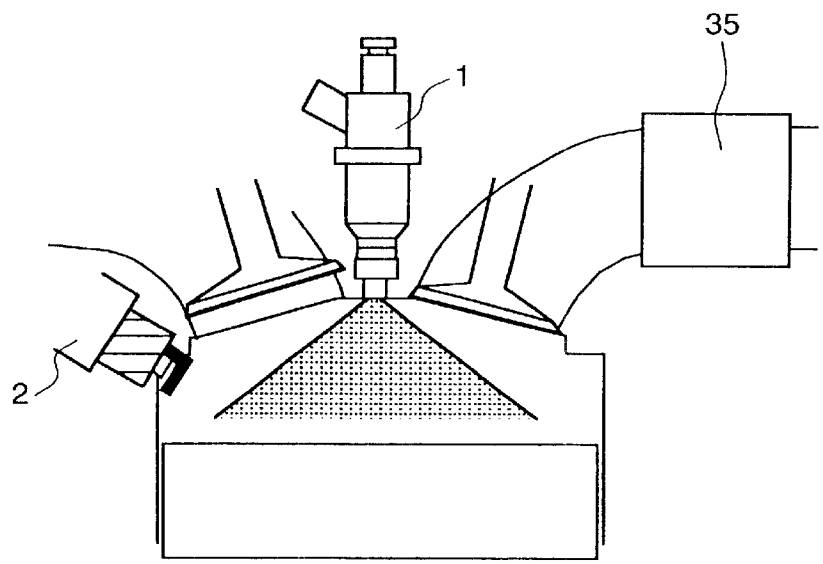
FIG. 16 shows another embodiment of the present invention.

An other embodiment of the present invention is shown by FIG. 16 further. An injector is arranged to center of the cylinder and the spark plug is arranged in a side of the cylinder. When the injector is arranged in the center of the cylinder, it becomes possible to uniformly disperse the fuel in the cylinder comparing the case to arranged it in the side, and there is a merit to be easy to form the uniform air-fuel mixture. When the spark plug is arranged in a corner of the cylinder, the flame propagation distance does not become equal, and the combustion efficiency easily falls. However in this embodiment, the burning mode is used by the spark plug only in a driving region where the compression igniting mode is difficult to be used such as the starting or in the cold temperature, and the efficiency aggravation caused by the side igniting is not a problem.

Figure 17:
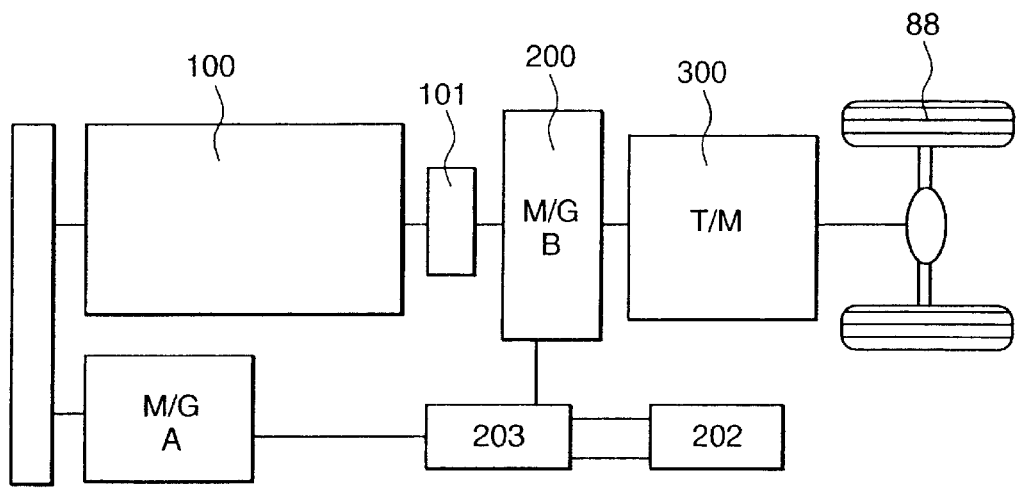
FIG. 17 shows another example applied the present invention to a hybrid automobile.

An example in which a hybrid automobile is used in the present invention, is explained in FIG. 17. Power of the engine 100 is communicated to the drive shaft 88 through motor generators (A, B), and a speed change gear 300. The motor generators (A, B) are connected with an inverter 203 and a battery 202 electrically. Energy in the deceleration is collected by the motor generator (B), and it is saved in the battery. In accelerating, an accelerating assist is performed by the motor generator (B). As the engine connected with the drive shaft can be separated by a clutch 101, an idle stop control and a power generation control by the motor generator (A) may be performed.

In such a combination as above, as the torque control can be assisted with the motor if the operation range of the engine is made narrow, there is a merit as that it is easy to drive the engine with a range having a good efficiency of the compression igniting engine.

Figure 18:
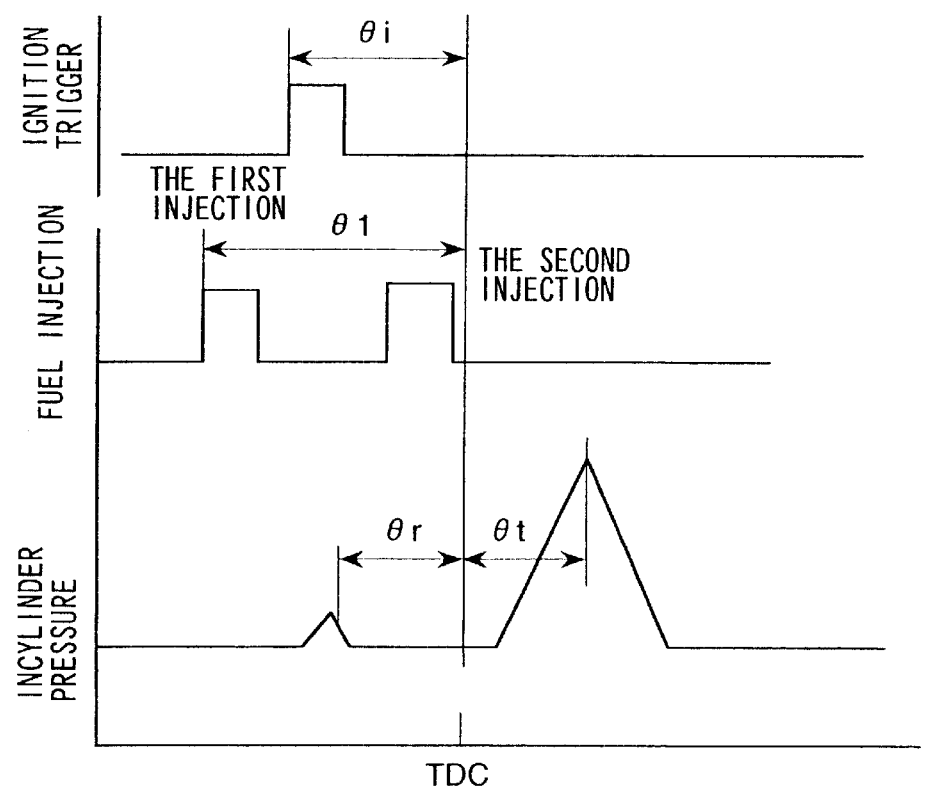
FIG. 18 shows a control method of the fuel injection time in the present invention.
Figure 19:
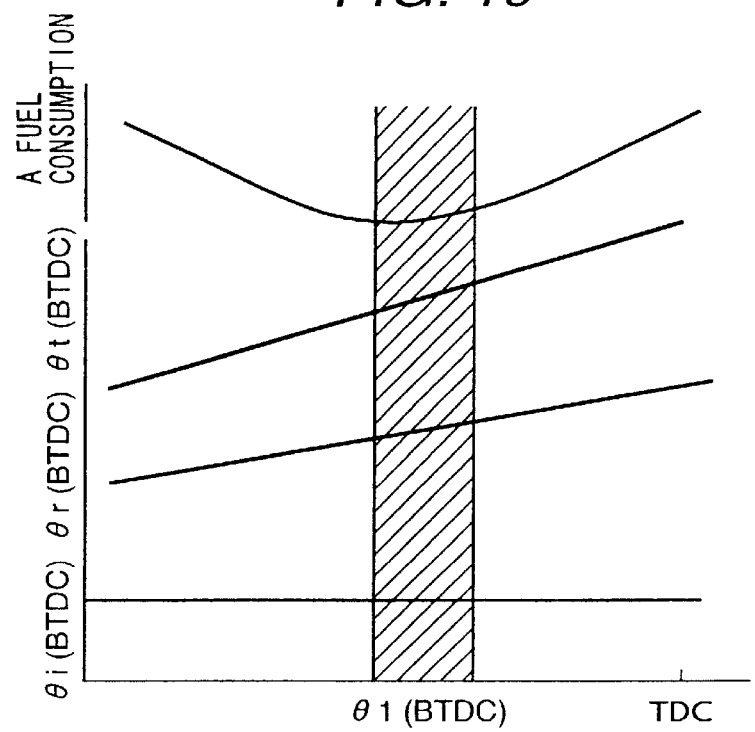
FIG. 19 shows a control method of the fuel injection time in the present invention.

An example of a control method with the burning pattern is shown by FIG. 18 and FIG. 19. The fuel consumption is improved when a peak θt of the in-cylinder pressure becomes to be in a predetermined position. This is because that, when being too advanced, the piston rises and the in-cylinder pressure becomes high and a negative job for an operation of the piston is done. When being too retarded, the piston falls too much, and an effective job is not done or the energy runs away into the exhaust gas by after burning. In order to control the peak θt of the in-cylinder pressure to be in the best position, the radical generating position θr is controlled. The radical generating position θr can be controlled by the first fuel injection timing θ1. The igniting trigger time is controlled to be in a position where the fuel consumption becomes the best.

Figure 20:
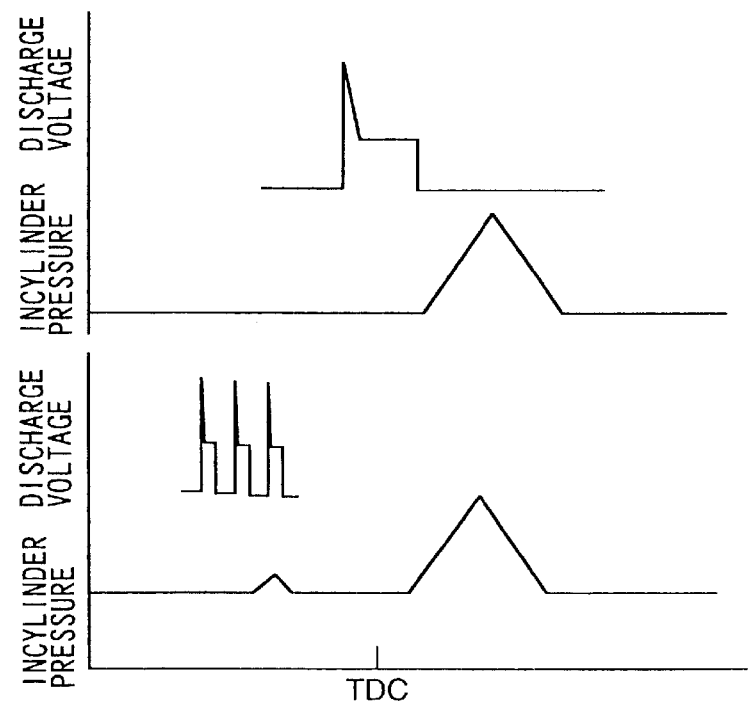
FIG. 20 shows a control method of the igniting trigger in the present invention.

An example of a control method of the igniting trigger is shown by FIG. 20. It shows a case that the spark plug is used as the igniting trigger. An upper part of FIG. 20 shows a discharge voltage wave-form in the spark ignition mode, and a lower figure shows a discharge voltage waveform in the compression ignition mode.

In the spark ignition mode, the air-fuel mixture is ignited with the spark ignition as in a conventional spark ignition engine, a discharge waveform having a capacity component and an induction component is obtained. In the compression igniting mode, the temperature of the air-fuel mixture is raised in order to keep a condition as that it is easy to be ignited and the radical is easy to occur. The induction component is reduced and multiplex pulse by the capacity component is supplied.

Thereby, many places where the radical is easy to occur are formed, and the multiple igniting is easy to be done. As the igniting trigger, it is effective to provide that a wave-having a frequency sympathizing with a main ingredient of gasoline is added with a microtron, and the air-fuel mixture of the gasoline is heated directly. In this case, it is different from the air-fuel mixture temperature rise method by a laser, and it has a merit that there is not any affection to be polluted optically. Moreover, the igniting trigger can be formed in many point in the cylinder. In a method by a laser, the igniting trigger is possible to be done in many point by making the laser a seat condition. Moreover, a microwave plasman igniting may be utilized as shown in Japanese Patent Laid-open No. 57-119164.

According to the present invention, in an in-cylinder fuel injection engine having a compression igniting mode, means for performing the first fuel injection for the initial combustion speed control before igniting and the second fuel injection for the engine torque control after that, are provided, thereby the igniting control in the large operation range becomes possible and the ultra lean burning operation becomes possible by providing the homogeneous air-fuel mixture.

Moreover, in an in-cylinder fuel injection engine having a compression igniting mode, as the igniting trigger means is provided, the igniting controllability improved still more.

What is claimed is:

1. An engine control system for controlling an in-cylinder fuel injection engine driven with a compression ignition mode, comprising
    a fuel injector for performing a first fuel injection in order to control an initial combustion speed in a stroke of said engine and for performing a second fuel injection after that in order to control an engine torque before an igniting timing in said stroke of said engine, wherein
    said fuel injector is operative to perform said first fuel injection with said intake valve of said engine opened and a piston of said engine has descended and to perform
    said second fuel injection with said intake and exhaust valves of said engine closed and after said piston has passed a top dead center.

2. An engine control system for controlling an in-cylinder fuel injection engine as defined in claim 1, wherein
    a ratio of said second fuel injection is controlled to be increased according to said engine torque.

3. An engine control system for controlling an in-cylinder fuel injection engine as defined in claim 1, wherein
    said second fuel injection is performed while a radical-flame occurs after said first fuel injection.

4. An engine control system for controlling an in-cylinder fuel injection engine as defined in claim 3, wherein
    occurring of said radical-flame is detected by at least one of an in-cylinder pressure sensor, an ion current censor and a radical-flame sensor.

5. An engine control system for controlling an in-cylinder fuel injection engine having compression ignition mode, comprising
    an igniting trigger, and means for adding said igniting trigger by controlling said igniting trigger after a first fuel injection for controlling an initial combustion speed and thereafter performing
    a second fuel injection for torque control, wherein said system is configured such that
    compression igniting of said engine is performed while said engine is operated in a state of low speed and low load and spark ignition burning of said engine is performed while said engine is operated in a state of high speed and high load.

6. An engine control system for controlling an in-cylinder fuel injection engine as defined in claim 5, comprising
    means for providing said igniting trigger for forming a rich spot in a homogeneous air-fuel mixture.

7. An engine control system for controlling an in-cylinder fuel injection engine as defined in claim 6, wherein
    timings of intake and exhaust valves of said engine are adjusted so as to increase internal EGR according to load of said engine.

8. An engine control system for controlling an in-cylinder fuel injection engine as defined in claim 6, wherein
    premixed air-fuel mixture is excited by discharging several times using capacity component of said spark plug in a compression igniting mode, and
    said discharge including an induction discharge component is performed as an igniting trigger in the spark ignition mode.

9. An engine control system for controlling an in-cylinder fuel injection engine as defined in claim 5, comprising
    means for providing said igniting trigger to let temperature of an air-fuel mixture rise, by using any one of a microtron, a laser, an spark plug, an EGR and compression ratio control means.

10. An engine control system for controlling an in-cylinder fuel injection engine as defined in claim 9, wherein
    frequency of said microtron is selected based on a resonance frequency of a main component of gasoline.

11. An engine control system for controlling an in-cylinder fuel injection engine as defined in claim 9, wherein
    when said load of said engine becomes bigger, air fuel ratio, stoichiometric air fuel ratio and homogeneous air-fuel mixture are formed and said engine is switched into spark ignition burning by said spark plug.

12. An engine control system for controlling an in-cylinder fuel injection engine as defined in claim 5, wherein time to generate a hot flame is controlled so as to provide a minimum fuel consumption by controlling timing to generate said radical-flame by a fuel injection timing.

13. An engine control system for controlling an in-cylinder fuel injection engine having compression ignition mode, comprising
an igniting trigger supplying means for controlling said igniting trigger so as to supply said igniting trigger after performing a first fuel injection for controlling initial combustion speed, wherein the system is configured such that a condition to generate a radical-flame is adjusted by controlling a state of said igniting trigger according to a driving state of said engine and, after forming said radical-flame, fuel for controlling a torque is injected according to a requested engine torque.

14. An engine control system for controlling an in-cylinder fuel injection engine as defined in claim 13, wherein
said igniting trigger supplying means forms a rich spot in homogeneous air-fuel.

15. An engine control system for controlling an in-cylinder fuel injection engine as defined in claim 14, wherein
frequency of said microtron is selected so as to correspond to a resonance frequency of a main component of gasoline.

16. An engine control system for controlling an in-cylinder fuel injection engine as defined in claim 14, wherein
timing of intake and exhaust valves of said engine are adjusted so as to increase internal EGR according to a load of said engine.

17. An engine control system for controlling an in-cylinder fuel injection engine as defined in claim 14, wherein
premixed air-fuel mixture is excited by performing several time discharge by capacity component of said spark plug in a compression igniting mode, and fuel discharging including an induction discharge component is performed as said igniting trigger in the spark ignition mode.

18. An engine control system for controlling an in-cylinder fuel injection engine as defined in claim 13, wherein
said igniting trigger supplying means makes temperature of an air-fuel mixture rise, by using any one of a microtron, a laser, an spark plug, an EGR and a compression ratio control means.

19. An engine control system for controlling an in-cylinder fuel injection engine as defined in claim 18, wherein timings of intake and exhaust valves of said engine are adjusted so as to increase internal EGR according to a load of said engine.

20. An engine control system for controlling an in-cylinder fuel injection engine as defined in claim 18, wherein
when said load of said engine becomes bigger, only the air fuel ratio, stoichiometric air fuel ratio and homogeneous air-fuel mixture are formed and said engine is switched into spark ignition burning by said spark plug.

* * * * *